US012626202B2

(12) United States Patent
Wang et al.

(10) Patent No.:    US 12,626,202 B2
(45) Date of Patent:         May 12, 2026

(54) ADAPTIVE DATA-FLOW PROCESSING SYSTEM AND ADAPTIVE DATA-FLOW PROCESSING METHOD

(71) Applicants:DIGIWIN CO., LTD., Shanghai (CN); DATA SYSTEMS CO., LTD., New Taipei City (TW)

(72) Inventors: Chu Yang Wang, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 183 days.

(21) Appl. No.: 17/875,450

(22) Filed:     Jul. 28, 2022

(65)            Prior Publication Data

US 2023/0281529 A1      Sep. 7, 2023

(30)        Foreign Application Priority Data

Mar. 3, 2022    (CN) .......................... 202210206995.1

(51) Int. Cl.
G06Q 10/06          (2023.01)
G06Q 10/0631      (2023.01)
(52) U.S. Cl.
CPC .............................. G06Q 10/06313 (2013.01)
(58) Field of Classification Search
CPC .. G06Q 10/10; G06Q 10/0633; G06Q 10/103; G06Q 10/067
See application file for complete search history.

(56)              References Cited

U.S. PATENT DOCUMENTS

| | | | | |
|---|---|---|---|---|
| 11,321,777 B1 * | 5/2022 | Gu | ......................... | G06Q 40/03 |
| 2009/0192867 A1 * | 7/2009 | Farooq | ............... | G06Q 30/0201 |
| | | | | 705/7.29 |
| 2013/0318061 A1 * | 11/2013 | Said | ...................... | G06F 16/252 |
| | | | | 707/705 |

(Continued)

FOREIGN PATENT DOCUMENTS

| | | | | | |
|---|---|---|---|---|---|
| CA | 3148071 A1 | * | 8/2022 | ............. | G06N 20/00 |
| CN | 109105289 | * | 2/2020 | | |
| CN | 111745200 | * | 11/2020 | | |

OTHER PUBLICATIONS

Moingeon, Bertrand, and Laurence Lehmann-Ortega. "Creation and implementation of a new business model: A disarming case study." M@ n@ gement (2010): 266-297. (Year: 2010).*

*Primary Examiner* — Hamzeh Obaid
(74) *Attorney, Agent, or Firm* — JCIPRNET

(57)              ABSTRACT
A business behavior management system and method are provided. The business behavior management system includes a storage unit storing multiple modules, and a processing unit reading the storage unit to execute the modules. The processing unit executes a project management module to initiate a business project. The processing unit executes a model management module to obtain a business project definition and parses the business project to generate a business implementation model. The processing unit executes a task management module to run a corresponding first business task in the business implementation model to cause the first business task to generate a second business data. The project management module determines whether a second data state of the second business data is an end state to end the business project.

12 Claims, 6 Drawing Sheets

(56) References Cited

U.S. PATENT DOCUMENTS

| | | | |
|---|---|---|---|
| 2015/0319302 A1* | 11/2015 | Anisimov | G06Q 10/0633 |
| | | | 715/205 |
| 2016/0063067 A1* | 3/2016 | Maitra | G06F 16/435 |
| | | | 707/769 |
| 2017/0185244 A1* | 6/2017 | Hall | G06F 9/451 |
| 2020/0286012 A1* | 9/2020 | Yang | G06Q 10/06311 |
| 2022/0101216 A1* | 3/2022 | Zhang | G06Q 10/10 |

* cited by examiner

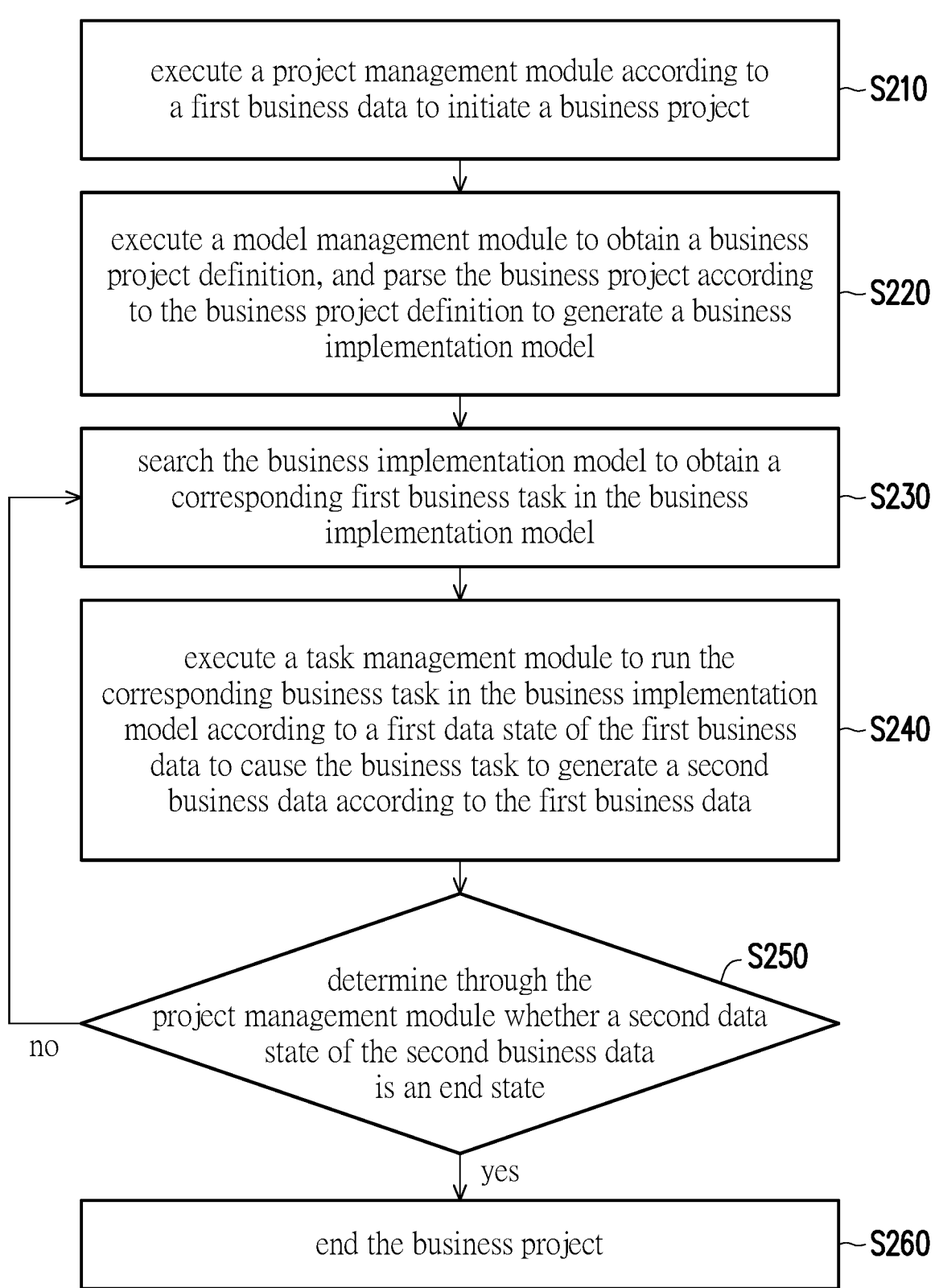

execute a project management module according to
a first business data to initiate a business project — S210 execute a model management module to obtain a business
project definition, and parse the business project according
to the business project definition to generate a business
implementation model — S220 search the business implementation model to obtain a
corresponding first business task in the business
implementation model — S230 execute a task management module to run the
corresponding business task in the business implementation
model according to a first data state of the first business
data to cause the business task to generate a second
business data according to the first business data — S240 determine through the
project management module whether a second data
state of the second business data
is an end state — S250 no yes end the business project — S260

FIG. 2

ADAPTIVE DATA-FLOW PROCESSING SYSTEM AND ADAPTIVE DATA-FLOW PROCESSING METHOD

CROSS-REFERENCE TO RELATED APPLICATION

This application claims the priority benefit of Chinese application serial no. 202210206995.1, filed on Mar. 3, 2022. The entirety of the above-mentioned patent application is hereby incorporated by reference herein and made a part of this specification.

BACKGROUND

Technical Field

The disclosure relates to a business management system, in particular to a business behavior management system and a business behavior management method.

Description of Related Art

The mainstream software for business behavior management is Business Process Management (BPM). A business process management system is a solution concept that defines the integration between business processes and constituent systems among members of an organization (user-to-user, user-to-application, application-to-application).

In this regard, the traditional business process management system mainly emphasizes the relationship between users and application systems. However, in the face of today's data explosion, traditional business process management systems can no longer effectively sense changes in business data, and immediately make the right response and processing. Even most of the processes in traditional business process management systems still rely on users to make decisions, and the knowledge of decision-making behavior cannot be effectively encapsulated and passed on, which makes it difficult for traditional business process management systems to optimize management behavior and management concepts in response to the introduction of business management systems.

SUMMARY

The disclosure is directed to a business behavior management system and a business behavior management method, capable of providing highly flexible and efficient business behavior management functions.

According to an embodiment of the disclosure, the business behavior management system of the disclosure includes a storage unit and a processing unit. The storage unit stores multiple modules. The processing unit is coupled to the storage unit and reads the storage unit to execute multiple modules. The processing unit executes a project management module according to a first business data to initiate a business project, and the processing unit executes a model management module to obtain a business project definition and parses the business project according to the business project definition to generate a business implementation model. The processing unit executes a task management module to run a corresponding first business task in the business implementation model according to a first data state of the first business data to cause the first business task to generate a second business data according to the first business data. The project management module determines whether a second data state of the second business data is an end state to end the business project.

According to an embodiment of the disclosure, the business behavior management method of the disclosure includes the following steps. A project management module is executed according to a first business data to initiate a business project. A model management module is executed to obtain a business project definition, and the business project is parsed according to the business project definition to generate a business implementation model. A task management module is executed to run a corresponding first business task in the business implementation model according to a first data state of the first business data to cause the first business task to generate a second business data according to the first business data. Through the project management module, whether a second data state of the second business data is an end state is determined to end the business project.

Based on the above, the business behavior management system and the business behavior management method of the disclosure are enterprise business behavior management systems and methods that operate from the perspective of data flow, and may efficiently perform corresponding business tasks instantly by paying attention to changes in business data, thus realizing highly flexible and efficient business behavior management functions.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a flowchart of a business behavior management method according to an embodiment of the disclosure.

DESCRIPTION OF THE EMBODIMENTS

Figure 1:
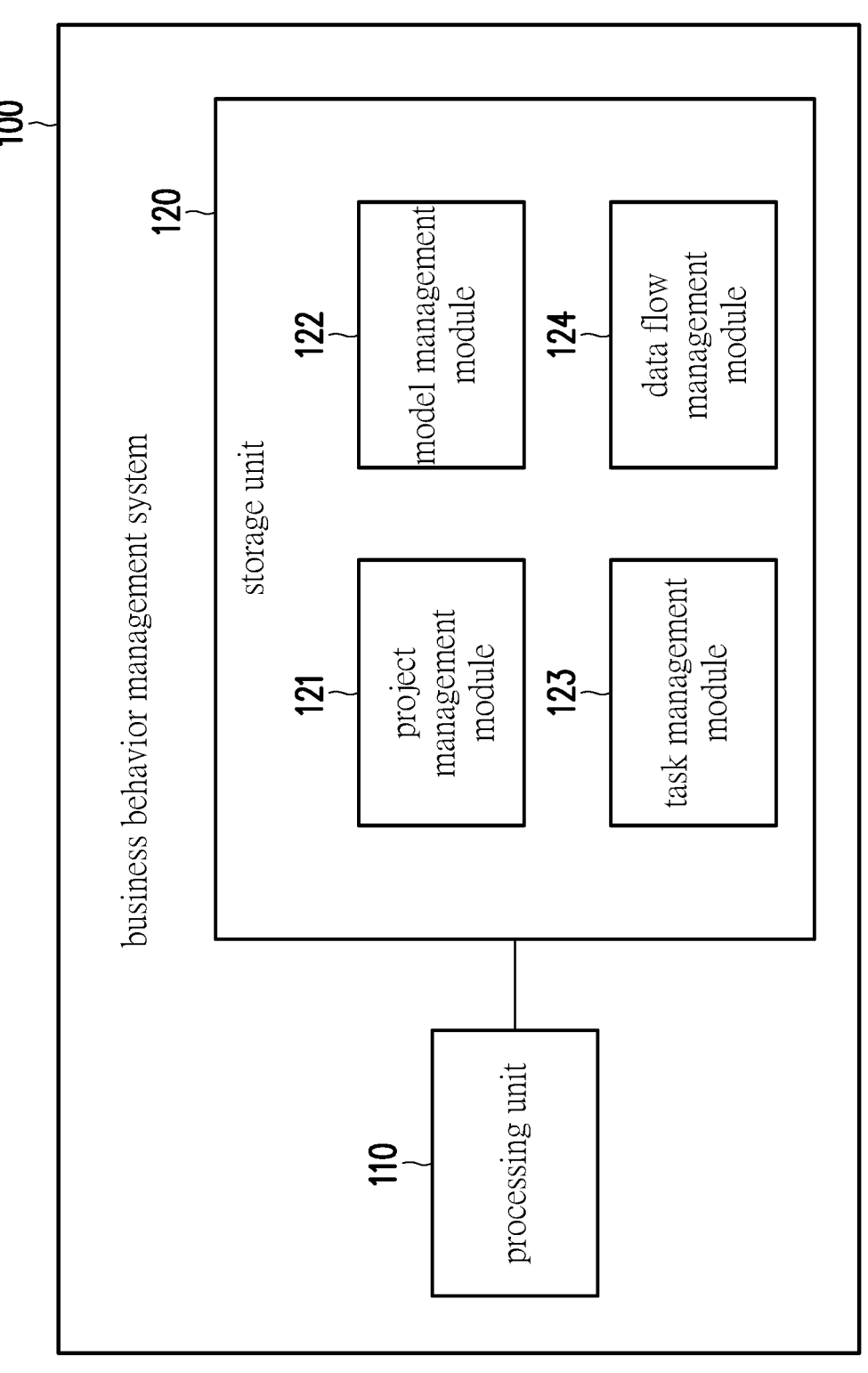
FIG. 1 is a schematic circuit diagram of a business behavior management system according to an embodiment of the disclosure.

Reference will now be made in detail to exemplary embodiments of the disclosure, examples of which are illustrated in the accompanying drawings. Wherever possible, the same reference numerals are used to represent the same or similar parts in the drawings and descriptions. In addition, the descriptions such as "first" and "second" in the claims of the disclosure are intended to conform the claims to the antecedent basis, not to limit the number or order of embodiments, and may or may not correspond to the descriptions such as "first" and "second" in the specific embodiments of the disclosure.

FIG. 1 is a schematic circuit diagram of a business behavior management system according to an embodiment of the disclosure. Referring to FIG. 1, a business behavior management system 100 includes a processing unit 110 and a storage unit 120. The processing unit 110 is coupled to the storage unit 120. The storage unit 120 may store, but is not limited to, a project management module 121, a model management module 122, a task management module 123, and a data flow management module 124. In one embodiment, the storage unit 120 may further store a database of parameters, implementation models, and data histories. In this embodiment, the business behavior management system 100 is a management system that implements a business task engine and uses data flow as the basis for business task transfer. The processing unit 110 may receive business data entered by the user operation, or the relevant business project execution request, to execute the corresponding business project. For example, a user manually initiate a business project by manually filling in the data required to initiate the project into the business behavior management system 100. Alternatively, the processing unit 110 may automatically detect the business data generated by other business systems due to changes in business data and its business data status, and automatically execute the corresponding business project. For example, the processing unit 110 may detect whether changes in business data are found in other business systems at regular intervals according to user requirements, and when changes in business data are found and meet the user's predetermined business logic, the processing unit 110 may capture the data that meets the predetermined logic as the data required to initiate the project to automatically initiate the business project. In this embodiment, the storage unit 120 may store multiple modules, so that the processing unit 110 obtains and executes functions/executable programs corresponding to the modules through the storage unit 120. The modules may, for example, correspond to multiple programs, modules or algorithms. In this embodiment, the processing unit 110 may generate a business implementation model by executing the modules. The business logic represents the model may be described in particular by means of relevant algorithms and software commonly applied to business behavior management, based on business behavior management process and method proposed by the disclosure.

In this embodiment, the business behavior management system 100 may be implemented by, for example, a personal computer (PC), a tablet, or a server and other computer devices with computing functions. The processing unit 110 may include, for example, a central processing unit (CPU), or other programmable general-purpose or special-purpose microprocessor, digital signal processor (DSP), application specific integrated circuits (ASIC), programmable logic device (PLD), other similar processing circuits or a combination of these devices. The processing unit 110 may include relevant circuits for implementing various embodiments of the disclosure, and the storage unit 120 may be a memory, such as a non-volatile memory (NVM). The storage unit 120 may store relevant programs, modules or algorithms for implementing various embodiments of the disclosure for access and execution by the processing unit 110.

Figures 3, 4:
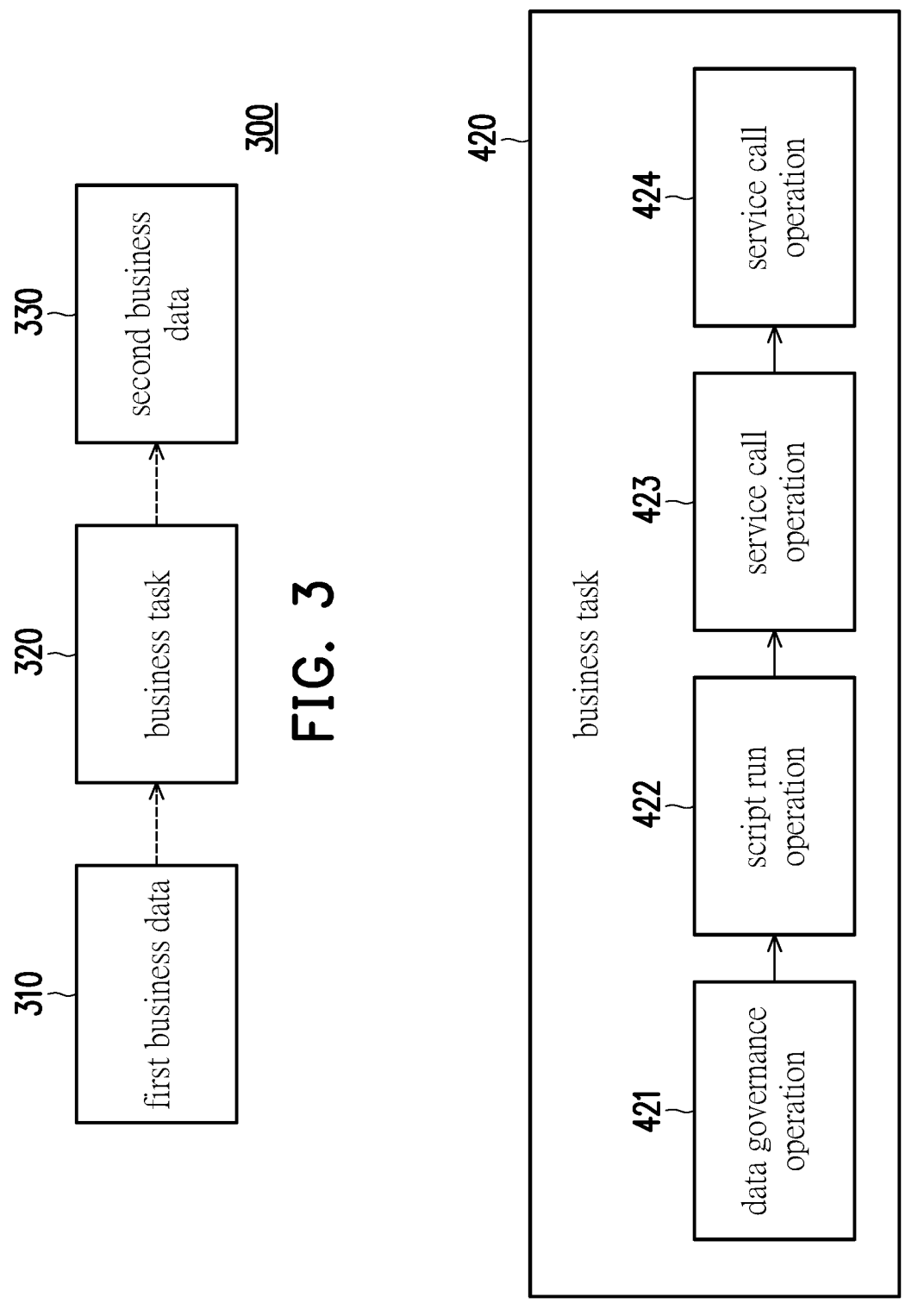
FIG. 3 is a schematic diagram of a business implementation model according to an embodiment of the disclosure.
FIG. 4 is a schematic diagram of a business task according to an embodiment of the disclosure.

FIG. 2 is a flowchart of a business behavior management method according to an embodiment of the disclosure. FIG. 3 is a schematic diagram of a business implementation model according to an embodiment of the disclosure. Referring to FIG. 1 to FIG. 3, the business behavior management system 100 may execute the following steps S210 to S260 to execute corresponding business projects according to business data. In step S210, the processing unit 110 may execute the project management module 121 according to a first business data 310 to initiate a business project. In step S220, the processing unit 110 may execute the model management module 122 to obtain a business project definition, and parse the business project according to the business project definition to generate, for example, a business implementation model 300 shown in FIG. 3. In step S230, the processing unit 110 may search the business implementation model 300 to obtain a corresponding first business task 320 in the business implementation model 300. In this regard, it is first stated that the business implementation model 300 shown in FIG. 3 is a basic business behavior model (data model: business data-business task-business data). The business implementation model of the disclosure is not limited to FIG. 3, and other embodiments have other further descriptions and definitions for the business implementation model. In fact, the business implementation model 300 may include a set of business project definitions, and each of the set of business project definitions includes at least one set of business behavior models.

For the business implementation model 300 shown in FIG. 3, since the business behavior management system 100 and the business behavior management method of the disclosure operate from the perspective of data flow, in the process of defining business behavior, the business behavior management system 100 may define the initial first business data 310 and its business state as a model starting point of the business implementation model 300, and the first business data 310 and its first business state may generate a second business data 330 and its second business state after the relevant processing, transformation, and/or operation of the business task 320. The business behavior management system 100 may define the second business data 330 and its second business state as a model endpoint of the business implementation model 300, and this entire scope of operation is referred to in the disclosure as a business project. The business project may include data as the model starting point and a starting state of the data, data as the model endpoint and an ending state of the data, and relevant metadata, parameters, processing logic, etc. required for auxiliary project operation. The first business data 310 may represent business data and data status of input data. The business task 320 may define the processing logic, processing method and processing steps of the input data. The second business data 330 represents business data and data status of output data. Moreover, the scope of the business project may include the entire business process, and the project definition will include (but not limited to) project parameters such as project initiation time, responsible parties, project starting state data, end state data and project initialization logic, etc.

In step S240, the processing unit 110 may execute the task management module 123 to run the corresponding business task 320 in the business implementation model 300 according to the first data state of the first business data 310 to cause the business task 320 to generate the second business data 330 according to the first business data 310. In this embodiment, the task management module 123 may be used to obtain a business task definition from the task management module 123, parse the business task definition, and process the relevant definition processing data required for running the business task. To further illustrate, the business task 320 is a basic core unit for processing data in the business implementation model 300, and the business task 320 may include at least one activity operation. The activity operation is all the steps necessary to complete the business task 320 (i.e., to execute the necessary algorithms or to perform the necessary data manipulation processes).

In this embodiment, the business task 320 may be an automatic task, and the task management module 123 may parse the business task 320 to generate at least one activity operation. The at least one activity operation includes at least one of a service call operation, a script run operation, and a data governance operation, and the processing unit 110 may run the at least one activity operation to obtain the second business data 330. For example, referring to FIG. 4, FIG. 4 is a schematic diagram of a business task according to an embodiment of the disclosure. A business task 420 may include a data governance operation 421, a script run operation 422, a service call operation 423, and another service call operation 424 that run in sequence. However, in one embodiment, the first business task 310 may also be a manual task, and the task management module 123 may parse the first business task 310 to generate a manual processing operation. The processing unit 110 may assign work according to the manual processing operation, for example, the business behavior management system 100 may require the user to perform relevant business operations through a specific user interface so that the processing unit 110 may obtain the second business data 330.

In step S250, through the project management module 121, the processing unit 110 may determine whether a second data state of the second business data 330 is an end state. If not, the processing unit 110 may re-execute step S230 to execute at least one corresponding second business task according to the second business data 330 and its second data state to cause the at least one second business task to generate a third business data according to the second business data 330. If yes, the processing unit 110 ends the business project. Therefore, the business behavior management system 100 of the disclosure has highly efficient business behavior management functions. In addition, in the above process, the processing unit 110 may also manage and record the data flow in the business implementation model through the data flow management module 124.

Figure 5A:
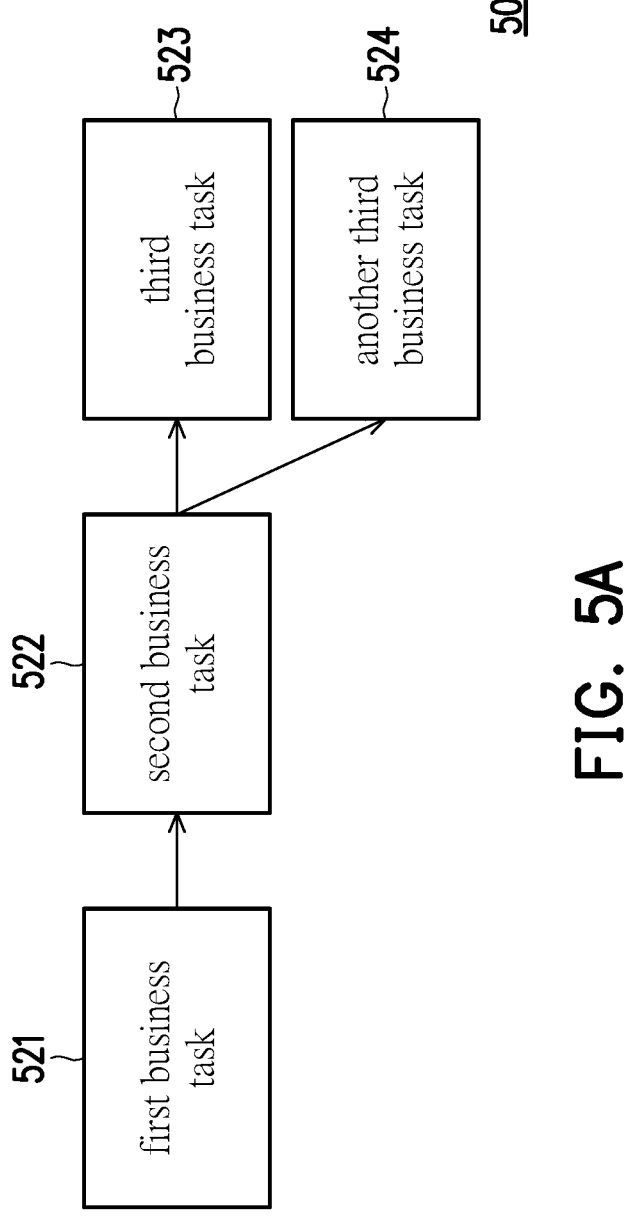
FIG. 5A is a schematic diagram of a project scenario according to an embodiment of the disclosure.
Figure 5B:
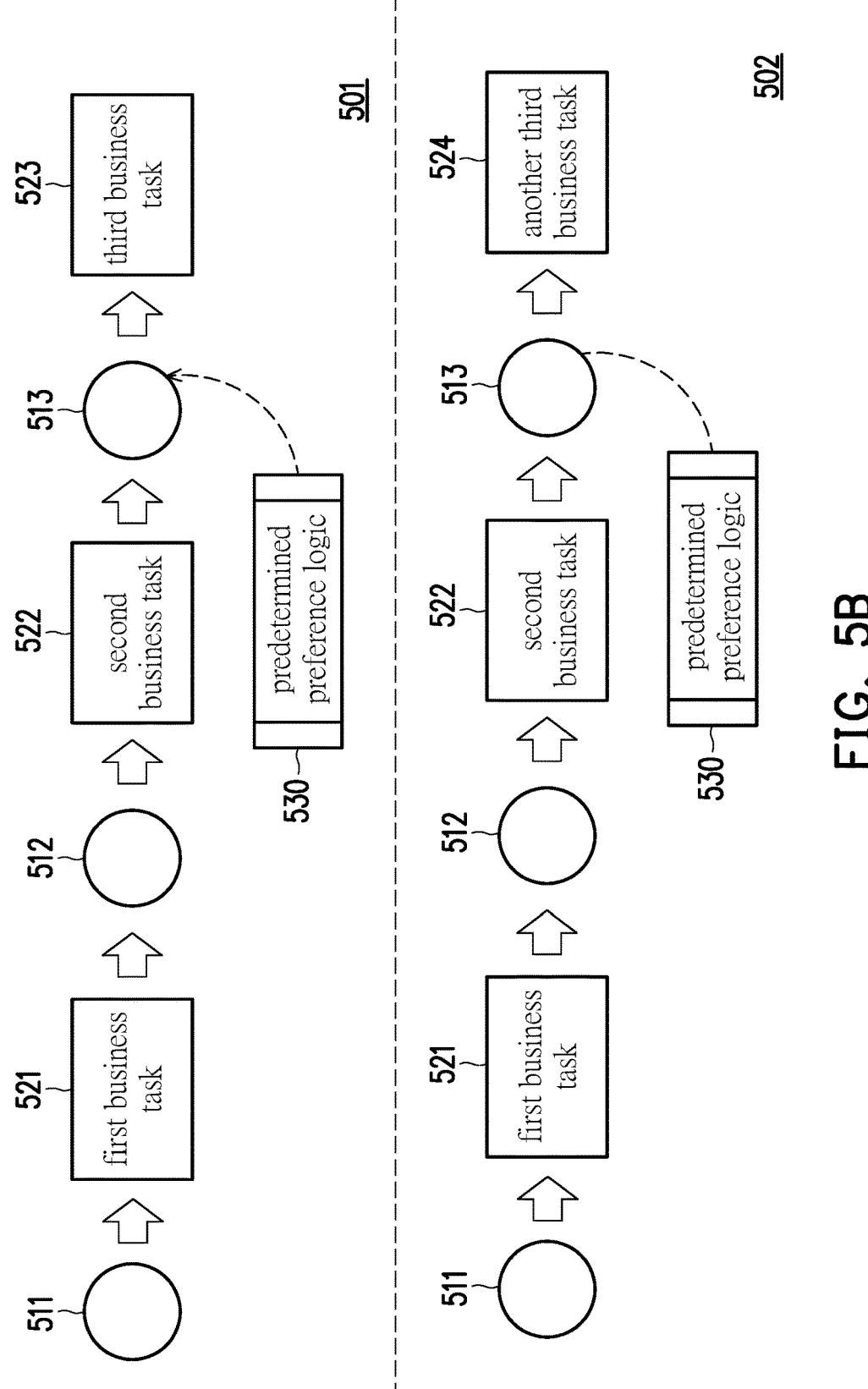
FIG. 5B is a schematic diagram of multiple business implementation models according to an embodiment of the disclosure.

FIG. 5A is a schematic diagram of a project scenario according to an embodiment of the disclosure. FIG. 5B is a schematic diagram of multiple business implementation models according to an embodiment of the disclosure. Referring to FIG. 1, FIG. 5A, and FIG. 5B, this embodiment is used to illustrate an exemplary embodiment of the disclosure for implementing preferred functions of multiple business implementation models. In this embodiment, the business behavior management system 100 may construct business implementation models 501 and 502 shown in FIG. 5B according to a project scenario 500 shown in FIG. 5A. As shown in FIG. 5A, the project scenario 500 may start with an execution target of a first business task 521, and continue with a second business task 522. However, after the second business task 522, a third business task 523 or another business task 524 may follow. For example, the project scenario 500 may be, for example, a product manufacturing scenario. The first business task 521 may be, for example, a first product process. The second business task 522 may be, for example, a second product process. The third business task 523 may be an in-plant process, and another business task 524 may be an out-of-plant process. In this embodiment, the business behavior management system 100 may parse the business project shown in FIG. 5A according to the corresponding project definition to generate, for example, two business implementation models 501 and 502 shown in FIG. 5B.

In the business implementation model 501, the processing unit 110 may recursively execute the process as in FIG. 2. In this regard, a first business data 511 with a first data state may generate a second business data 512 with a second data state after being executed by the first business task 521. The second business data 512 with the second data state may generate a third business data 513 with a third data state after being executed by the second business task 522. Next, the processing unit 110 may successively provide the third business data 513 with the third data state to the third business task 523. In the business implementation model 502, the processing unit 110 may recursively execute the process as in FIG. 2. In this regard, a first business data 511 with a first data state may generate a second business data 512 with a second data state after being executed by the first business task 521. The second business data 512 with the second data state may generate a third business data 513 with a third data state after being executed by the second business task 522. Next, the processing unit 110 may successively provide the third business data 513 with the third data state to another third business task 524. In this embodiment, the processing unit 110 may execute a predetermined preference logic 530 and current scenario information to select and run the corresponding third business task 523 or another third business task 524 in the business implementation models 501 and 502 respectively. For example, the processing unit 110 may, for example, execute the predetermined preference logic 530 to determine whether the generation corresponding to the third business task 523 or another third business task 524 is sufficient and can be delivered on time to automatically select the appropriate business task to perform. In other words, the business behavior management system 100 of this embodiment may instantly feedback and automatically execute the most appropriate business tasks to intelligently provide the user with the best business processing behavior.

Figure 6:
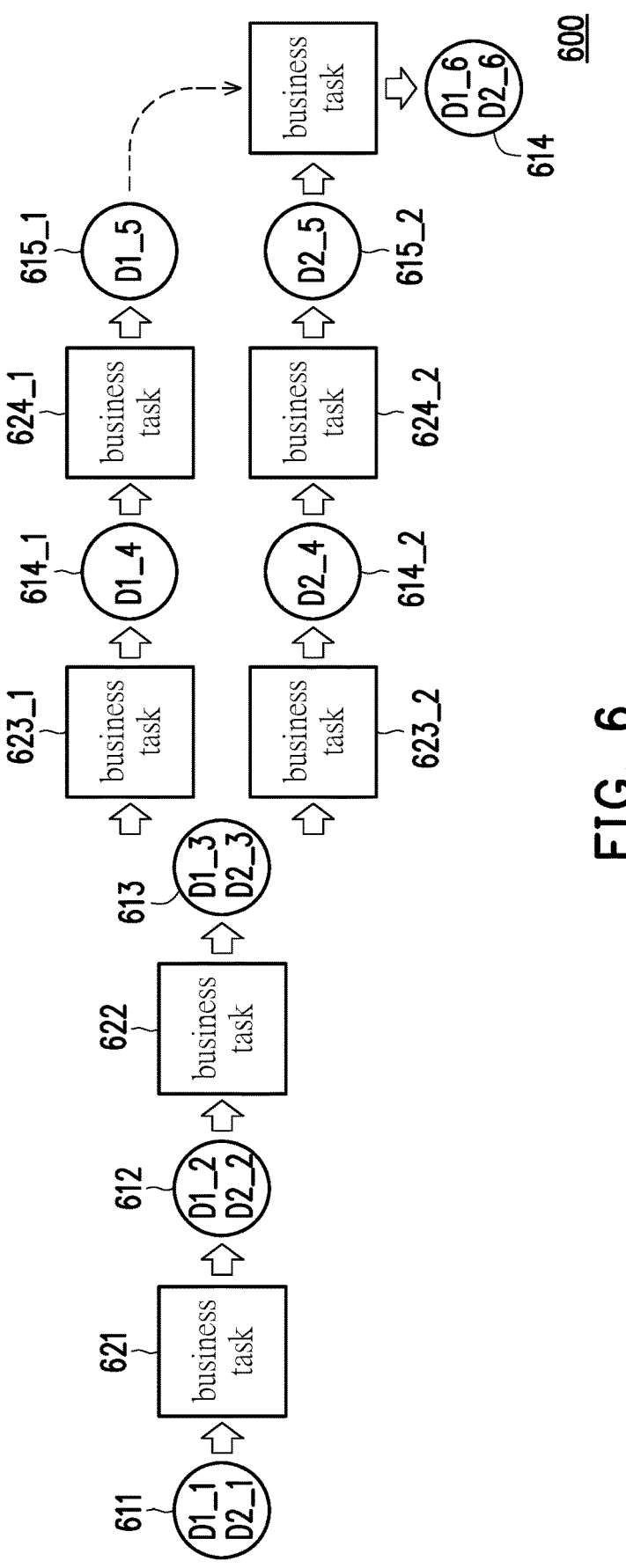
FIG. 6 is a schematic diagram of a business implementation model of a complex business scenario according to an embodiment of the disclosure.

FIG. 6 is a schematic diagram of a business implementation model of a complex business scenario according to an embodiment of the disclosure. Referring to FIG. 1 and FIG. 6, this embodiment is used to illustrate an exemplary embodiment of how to apply to complex business scenarios. In this embodiment, the business behavior management system 100 may execute the project management module 121 according to multiple first business data 611 (e.g., data D1_1, D2_1) to initiate a business project. The processing unit 110 may execute the model management module 122 to obtain a business project definition, and parse the business project according to the business project definition to generate a business implementation model 600 as shown in FIG. 6. In this embodiment, the processing unit 110 may execute the task management module 123 to merge and run the first business data 611 (e.g., data D1_1, D2_1) to a same corresponding business task 621 in the business implementation model 600 according to multiple first data states of the first business data 611 (e.g., data D1_1, D2_1) to cause the business task 621 to generate multiple second business data 612 (e.g., data D1_2, D2_2) according to the first business data 611 (e.g., data D1_1, D2_1). Next, the processing unit 110 may merge and run the second business data 612 (e.g., data D1_2, D2_2) to a same corresponding business task 622 in the business implementation model 600 according to multiple second data states of the second business data 612 (e.g., data D1_2, D2_2) to cause the business task 622 to generate multiple third business data 613 (e.g., data D1_3, D2_3) according to the second business data 612 (e.g., data D1_2, D2_2).

It should be noted that when the project management module 121 determines that multiple third data states of the third business data 613 (e.g. data D1_3, D2_3) are not the end states, through the task management module 123, the processing unit 110 may run in triage the third business data 613 (e.g., data D1_3, D2_3) to corresponding different third business tasks 623_1, 623_2 in the business implementation model 600 according to the third data states of the third business data 613 (e.g., data D1_3, D2_3) to cause the third business data 613 (e.g., data D1_3, D2_3) to generate multiple fourth business data 614_1, 614_2 (e.g., data D1_4, D2_4) according to different third business tasks 623_1, 623_2, respectively. In other words, the business behavior management system 100 of this embodiment may implement data triage processing functions to effectively extend the data model, which may be effectively applied to complex business scenarios.

Next, through the task management module 123, the processing unit 110 runs in triage the fourth business data 614_1, 614_2 (e.g., data D1_4, D2_4) to corresponding different fourth business tasks 624_1, 624_2 in the business implementation model 600 according to multiple fourth data states of the fourth business data 614_1, 614_2 (e.g., data D1_4, D2_4) respectively to cause the fourth business data 614_1, 614_2 (e.g., data D1_4, D2_4) to generate multiple fifth business data 615_1, 615_2 (e.g., data D1_5, D2_5) according to different fourth business tasks 624_1, 624_2, respectively. Next, since respective multiple fifth data states of the fifth business data 615_1 and 615_2 (e.g., data D1_5, D2_5) are the same data states, the processing unit 110 may merge and run the fifth business data 615_1 and 615_2 (e.g., the data D1_5 and D2_5) to a same corresponding business task 626 in the business implementation model 600 according to the fifth data states of the fifth business data 615_1 and 615_2 (e.g., the data D1_5 and D2_5) to cause a business task 625 to generate multiple sixth business data 614 (e.g., data D1_6, D2_6) according to the fifth business data 615_1 and 615_2 (e.g., the data D1_5 and D2_5). In other words, the business behavior management system 100 of this embodiment may implement data merging and processing functions to effectively reduce excessive and redundant execution operations during the operation of complex business scenarios.

In addition, the processing unit 110 may also record the data history by executing the data flow management module 124. Because of the flow of business data among business tasks, data triage and data merging may occur as in the exemplary embodiment, and the business tasks currently running on the business data are not easily predicted and tracked. Thus, the data flow management module 124 of this embodiment may also persist information corresponding to changes in business data in response to any changes in business data, including but not limited to changes in the status of business data, changes in the business task in which the business data is located, etc., and the data flow management module 124 may also provide, but not limited to, information and parameters required for the operation of related data triage, data merging, project termination, etc.

To sum up, the business behavior management system and the business behavior management method of the disclosure may effectively manage the operation process of enterprise business behavior based on the business behavior model constructed based on data model aggregation, and may realize the business data flow function that is automated and characterized by high execution efficiency and high management efficiency. Unlike traditional workflow systems, the disclosure is a data-flow oriented business behavior management system and method that is closer to the needs of enterprise digital transformation and more flexible, and may be tailored to help enterprises accomplish their business goals.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A adaptive data-flow processing system, comprising:
a memory, storing a plurality of modules comprising a task management module implementing dynamic business task allocation mechanisms and a data flow management module executing continuous data state monitoring; and
a processor, coupled to the memory, and reading the memory to execute the modules,
wherein the processor executes a project management module according to a plurality of first business data to initiate a business project, wherein the processor executes a model management module to obtain a business project definition and parses the business project according to the business project definition to generate a business implementation model,
wherein the data flow management module maintains a continuous data state monitoring mechanism throughout the business implementation model, and the processor executes the task management module implementing a business task engine that employs data flow-based task transfer mechanisms to merge and run the same corresponding first business task in the business implementation model according to a plurality of first data states of the first business data to cause the first business task to generate a plurality of second business data according to the first business data,
wherein the first business task is an automatic task, and the task management module parses the first business task to generate at least one activity operation, wherein the at least one activity operation comprises at least one of a service call operation, a script run operation, and a data governance operation,
wherein the project management module, executed by the processor, determines whether a plurality of second data states of the second business data are end states to end the business project, such that the processor determines the completion of the business project and determines whether to run one or more subsequent task according to the second data states of the generated second business data,
wherein when the project management module determines that the second data state of the second business data is not the end state, the task management module implements adaptive task allocation by selectively executing either task merging or task triage mechanisms based on the second data states, so as to cause the generation of a plurality of third business data,
wherein the task management module implements the dynamic business task allocation mechanisms by executing a predetermined preference logic and current scenario information to select and run the corresponding business task, including determining whether the output corresponding to the business task is sufficient and deliverable within a required time, wherein the data flow management module persists information corresponding to changes in business data, including changes in the status of business data and the business task in which the business data is located, and provides information and parameters required for task triage, task merging, and project termination, wherein the task management module reduces excessive and redundant execution operations by:

selectively performing task triage to run different business tasks respectively according to different business data, and performing task merging to run the same corresponding business task for multiple business data; and, in response to said task triage or task merging, automatically performing a project termination operation on a business project identified as redundant to thereby reclaim computational resources.

2. The adaptive data-flow processing system according to claim 1, wherein when the project management module determines that the second data state of the second business data is not the end state, the task management module selects and runs one of a plurality of corresponding second business tasks in the business implementation model according to the second data state of the second business data to cause the one of the second business tasks to generate one of the plurality of third business data according to the second business data.

3. The adaptive data-flow processing system according to claim 1, wherein when the project management module determines that the second data states of the second business data are not the end states, the task management module runs in triage a corresponding different plurality of second business tasks in the business implementation model according to the second data states of the second business data to cause the second business tasks to generate the plurality of third business data according to the second business data respectively.

4. The adaptive data-flow processing system according to claim 1, wherein the task management module performs task triage in response to determining that a plurality of business data comprise differing data states, thereby causing the business tasks to generate a plurality of second business data according to different business tasks respectively.

5. The adaptive data-flow processing system according to claim 1, wherein the task management module performs task merging in response to determining that a plurality of business data share the same data states, thereby causing the business task to generate a plurality of second business data according to the same corresponding business task.

6. The adaptive data-flow processing system according to claim 1, wherein the predetermined preference logic evaluates whether a generation corresponding to a business task is sufficient and can be delivered on time to automatically select the corresponding business task.

7. A adaptive data-flow processing method, adapted for an adaptive data-flow processing system, wherein the adaptive data-flow processing system comprising a memory and a processor and the memory storing a task management module implementing dynamic business task allocation mechanisms and a data flow management module executing continuous data state monitoring, comprising:

by the processor executing a project management module, initiating a business project according to a plurality of first business data;

by the processor executing a model management module, obtaining a business project definition, and parsing the business project according to the business project definition to generate a business implementation model;

by the processor executing the data flow management module, maintaining a continuous data state monitoring mechanism throughout the business implementation model;

by the processor executing the task management module implementing a business task engine that employs data flow-based task transfer mechanisms, merging and running the same corresponding first business task in the business implementation model according to a plurality of first data states of the first business data to cause the first business task to generate a plurality of second business data according to the first business data wherein the first business task is an automatic task, and the task management module parses the first business task to generate at least one activity operation, wherein the at least one activity operation comprises at least one of a service call operation, a script run operation, and a data governance operation;

by the processor executing the project management module, determining whether a plurality of second data states of the plurality of second business data are end states to end the business project, such that the processor determines the completion of the business project and determines whether to run one or more subsequent task according to the second data states of the generated second business data; by the processor executing the project management module, when the project management module determines that the second data state of the second business data is not the end state, implementing, by executing the task management module, adaptive task allocation by selectively executing either task merging or task triage mechanisms based on the second data states, so as to cause the generation of a plurality of third business data;

by the processor executing the task management module, implementing the dynamic business task allocation mechanisms by executing a predetermined preference logic and current scenario information to select and run the corresponding business task, including determining whether the output corresponding to the business task is sufficient and deliverable within a required time;

by the processor executing the data flow management module, persisting information corresponding to changes in business data, including changes in the status of business data and the business task in which the business data is located, and providing information and parameters required for task triage, task merging, and project termination; and by the processor executing the task management module, reducing excessive and redundant execution operations by:

selectively performing task triage to run different business tasks respectively according to different business data, and performing task merging to run the same corresponding business task for multiple business data; and, in response to said task triage or task merging, automatically performing a project termination operation on a business project identified as redundant to thereby reclaim computational resources.

8. The adaptive data-flow processing method according to claim 7 further comprising:

when the project management module determines that the second data state of the second business data is not the end state, through the task management module, selecting and running one of a plurality of corresponding second business tasks in the business implementation model according to the second data state of the second business data to cause the one of the second business tasks to generate one of plurality of third business data according to the second business data.

9. The adaptive data-flow processing method according to claim 7 further comprising:

when the project management module determines that the second data states of the second business data are not the end states, through the task management module, running in triage a corresponding different plurality of second business tasks in the business implementation model according to the second data states of the second business data to cause the second business tasks to generate the plurality of third business data according to the second business data respectively.

10. The adaptive data-flow processing according to claim 7 further comprising:

step of selectively performing task triage is performed in response to determining that a plurality of business data comprise differing data states, thereby causing the business tasks to generate a plurality of second business data according to different business tasks respectively.

11. The adaptive data-flow processing method according to claim 7 further comprising:

step of performing the task merging is performed in response to determining that multiple instances of the second business data share consistent data states or identical processing logic, thereby routing said data to the same corresponding business task when the project management module determines that at least one of the second data states of the second business data is not the corresponding end state, through the task management module, running at least one corresponding second business task in the business implementation model according to the at least one of the second data states of the second business data to cause the at least one second business task to generate at least one of the plurality of third business data according to the at least one of the second business data.

12. The adaptive data-flow processing method according to claim 7 further comprising:

step of implementing the dynamic business task allocation mechanisms comprises evaluating, via the predetermined preference logic, whether a generation corresponding to a business task is sufficient and can be delivered on time to automatically select the corresponding business task.

\* \* \* \* \*